(12) United States Patent
Hampel et al.

(10) Patent No.: US 11,115,942 B2
(45) Date of Patent: Sep. 7, 2021

(54) SCHEDULING FOR A TIME-SYNCHRONIZED WIRELESS NETWORK

(71) Applicant: QUALCOMM Incorporated, San Diego, CA (US)

(72) Inventors: Karl Georg Hampel, Hoboken, NJ (US); Rajat Prakash, San Diego, CA (US); Peerapol Tinnakornsrisuphap, San Diego, CA (US); Satashu Goel, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 16/257,536

(22) Filed: Jan. 25, 2019

(65) Prior Publication Data

US 2019/0239172 A1 Aug. 1, 2019

Related U.S. Application Data

(60) Provisional application No. 62/624,532, filed on Jan. 31, 2018.

(51) Int. Cl.
*H04W 28/02* (2009.01)
*H04W 56/00* (2009.01)
(Continued)

(52) U.S. Cl.
CPC ..... *H04W 56/001* (2013.01); *H04W 28/0268* (2013.01); *H04W 56/005* (2013.01);
(Continued)

(58) Field of Classification Search
CPC .......... H04W 28/0268; H04W 56/001; H04W 56/005; H04W 56/0065; H04W 72/14; H04W 76/12; H04B 7/0413
(Continued)

(56) References Cited

U.S. PATENT DOCUMENTS

| | | | |
|---|---|---|---|
| 2004/0063426 A1 * | 4/2004 | Hunkeler | H04W 48/10 455/426.1 |
| 2011/0110266 A1 | 5/2011 | Li et al. | |

(Continued)

FOREIGN PATENT DOCUMENTS

| | | |
|---|---|---|
| WO | 2016148614 A1 | 9/2016 |
| WO | 2017030697 A1 | 2/2017 |

OTHER PUBLICATIONS

International Search Report and Written Opinion—PCT/US2019/015406—ISA/EPO—dated Apr. 29, 2019.

*Primary Examiner* — Melvin C Marcelo
*Assistant Examiner* — Natali Pascual Peguero
(74) *Attorney, Agent, or Firm* — Qualcomm Incorporated

(57) ABSTRACT

Various aspects of the present disclosure generally relate to wireless communication. In some aspects, an access node may synchronize a clock of the access node which is associated with communication on a local area network to a frame structure of a time-synchronized wireless network. The access node may receive configuration information relating to a quality of service profile and a first set of time intervals for the clock of the access node. The access node may map the first set of time intervals for the clock of the access node to a second set of time intervals of the frame structure of the time-synchronized wireless network. The access node may communicate on the time-synchronized wireless network during one or more of the second set of time intervals. Numerous other aspects are provided.

30 Claims, 11 Drawing Sheets

(51) Int. Cl.
  *H04W 72/14* (2009.01)
  *H04W 76/12* (2018.01)
  *H04B 7/0413* (2017.01)

(52) U.S. Cl.
  CPC ....... *H04W 56/0065* (2013.01); *H04W 72/14* (2013.01); *H04W 76/12* (2018.02); *H04B 7/0413* (2013.01)

(58) Field of Classification Search
  USPC .......................... 370/329, 395.62, 509, 512
  See application file for complete search history.

(56) References Cited

U.S. PATENT DOCUMENTS

| | | | |
|---|---|---|---|
| 2015/0023372 A1* | 1/2015 | Boatright | H04L 12/4645 370/474 |
| 2016/0277935 A1* | 9/2016 | Singh | H04W 16/14 |
| 2018/0270803 A1* | 9/2018 | Kwak | H04L 1/1861 |
| 2019/0305878 A1* | 10/2019 | Bienas | H04L 5/0046 |

\* cited by examiner

SCHEDULING FOR A TIME-SYNCHRONIZED WIRELESS NETWORK

CROSS-REFERENCE TO RELATED APPLICATIONS UNDER 35 U.S.C. § 119

This application claims priority to U.S. Provisional Patent Application No. 62/624,532, filed on Jan. 31, 2018, entitled "TECHNIQUES AND APPARATUSES FOR SCHEDULING FOR A TIME-SYNCHRONIZED WIRELESS NETWORK," which is hereby expressly incorporated by reference herein.

FIELD OF THE DISCLOSURE

Aspects of the present disclosure generally relate to wireless communication, and more particularly to techniques and apparatuses for scheduling for a time-synchronized wireless network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include synchronizing a clock of an access node to a frame structure of a time-synchronized wireless network, wherein the clock is associated with communication on a local area network. The method may include determining configuration information relating to a quality of service profile and a first set of time intervals for the clock of the access node. The method may include mapping the first set of time intervals for the clock of the access node to a second set of time intervals defined by the frame structure of the time-synchronized wireless network based at least in part on synchronizing the clock of the access node to the frame structure of the time-synchronized wireless network. The method may include communicating on the time-synchronized wireless network during one or more of the second set of time intervals based at least in part on the quality of service profile and based at least in part on mapping the first set of time intervals to the second set of time intervals.

In some aspects, an access node for wireless communication may include memory and one or more processors operatively coupled to the memory. The memory and the one or more processors may be configured to synchronize a clock of the access node to a frame structure of a time-synchronized wireless network, wherein the clock is associated with communication on a local area network. The memory and the one or more processors may be configured to determine configuration information relating to a quality of service profile and a first set of time intervals for the clock of the access node. The memory and the one or more processors may be configured to map the first set of time intervals for the clock of the access node to a second set of time intervals defined by the frame structure of the time-synchronized wireless network based at least in part on synchronizing the clock of the access node to the frame structure of the time-synchronized wireless network. The memory and the one or more processors may be configured to communicate on the time-synchronized wireless network during one or more of the second set of time intervals based at least in part on the quality of service profile and based at least in part on mapping the first set of time intervals to the second set of time intervals.

In some aspects, a non-transitory computer-readable medium may store one or more instructions for wireless communication. The one or more instructions, when executed by one or more processors of an access node, may cause the one or more processors to synchronize a clock of the access node to a frame structure of a time-synchronized wireless network, wherein the clock is associated with communication on a local area network. The one or more instructions, when executed by the one or more processors of the access node, may cause the one or more processors to determine configuration information relating to a quality of service profile and a first set of time intervals for the clock of the access node. The one or more instructions, when executed by the one or more processors of the access node, may cause the one or more processors to map the first set of time intervals for the clock of the access node to a second set of time intervals defined by the frame structure of the time-synchronized wireless network based at least in part on synchronizing the clock of the access node to the frame structure of the time-synchronized wireless network. The one or more instructions, when executed by the one or more processors of the access node, may cause the one or more processors to communicate on the time-synchronized wireless network during one or more of the second set of time intervals based at least in part on the quality of service profile and based at least in part on mapping the first set of time intervals to the second set of time intervals.

In some aspects, an apparatus for wireless communication may include means for synchronizing a clock of the apparatus to a frame structure of a time-synchronized wireless network, wherein the clock is associated with communication on a local area network. The apparatus may include means for determining configuration information relating to a quality of service profile and a first set of time intervals for the clock of the apparatus. The apparatus may include means for mapping the first set of time intervals for the clock of the apparatus to a second set of time intervals defined by the frame structure of the time-synchronized wireless network based at least in part on synchronizing the clock of the apparatus to the frame structure of the time-synchronized wireless network. The apparatus may include means for communicating on the time-synchronized wireless network during one or more of the second set of time intervals based at least in part on the quality of service profile and based at least in part on mapping the first set of time intervals to the second set of time intervals.

In some aspects, a method of wireless communication may include synchronizing a clock of a user equipment to a frame structure of a time-synchronized wireless network, wherein the clock is associated with communication on a local area network. The method may include receiving configuration information relating to a quality of service profile and a first set of time intervals for the clock of the user equipment. The method may include determining a second set of time intervals for the frame structure of the time-synchronized wireless network based at least in part on the configuration information. The method may include communicating on the time-synchronized wireless network during one or more time intervals of the second set of time intervals.

In some aspects, a user equipment for wireless communication may include memory and one or more processors operatively coupled to the memory. The memory and the one or more processors may be configured to synchronize a clock of the user equipment to a frame structure of a time-synchronized wireless network, wherein the clock is associated with communication on a local area network. The memory and the one or more processors may be configured to receive configuration information relating to a quality of service profile and a first set of time intervals for the clock of the user equipment. The memory and the one or more processors may be configured to determine a second set of time intervals for the frame structure of the time-synchronized wireless network based at least in part on the configuration information. The memory and the one or more processors may be configured to communicate on the time-synchronized wireless network during one or more time intervals of the second set of time intervals.

In some aspects, a non-transitory computer-readable medium may store one or more instructions for wireless communication. The one or more instructions, when executed by one or more processors of a user equipment, may cause the one or more processors to synchronize a clock of the user equipment to a frame structure of a time-synchronized wireless network, wherein the clock is associated with communication on a local area network. The one or more instructions, when executed by the one or more processors of the user equipment, may cause the one or more processors to receive configuration information relating to a quality of service profile and a first set of time intervals for the clock of the user equipment. The one or more instructions, when executed by the one or more processors of the user equipment, may cause the one or more processors to determine a second set of time intervals for the frame structure of the time-synchronized wireless network based at least in part on the configuration information. The one or more instructions, when executed by the one or more processors of the user equipment, may cause the one or more processors to communicate on the time-synchronized wireless network during one or more time intervals of the second set of time intervals.

In some aspects, an apparatus for wireless communication may include means for synchronizing a clock of the apparatus to a frame structure of a time-synchronized wireless network, wherein the clock is associated with communication on a local area network. The apparatus may include means for receiving configuration information relating to a quality of service profile and a first set of time intervals for the clock of the apparatus. The apparatus may include means for determining a second set of time intervals for the frame structure of the time-synchronized wireless network based at least in part on the configuration information. The apparatus may include means for communicating on the time-synchronized wireless network during one or more time intervals of the second set of time intervals.

Aspects generally include a method, apparatus, system, computer program product, non-transitory computer-readable medium, user equipment, base station, access node, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
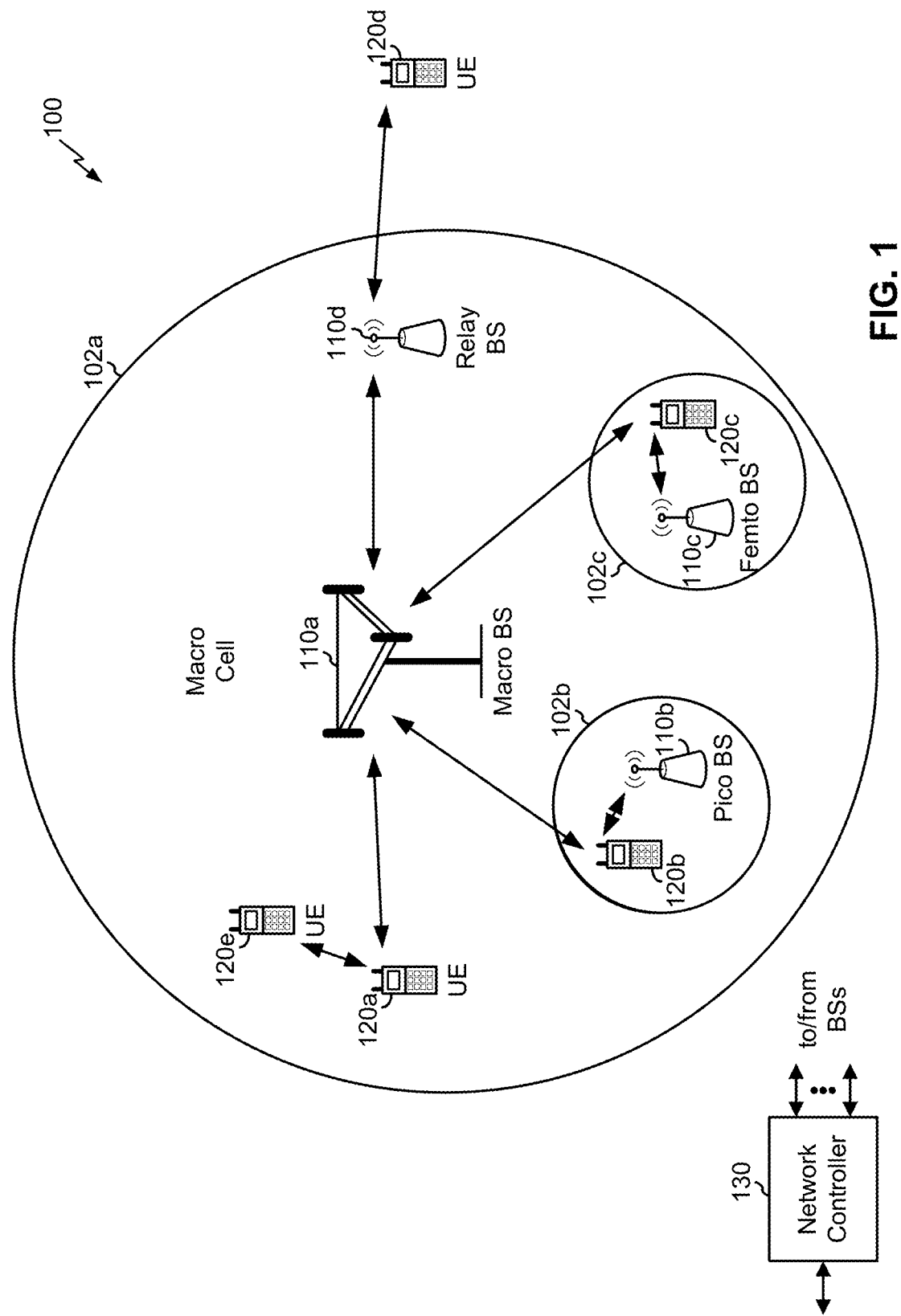
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
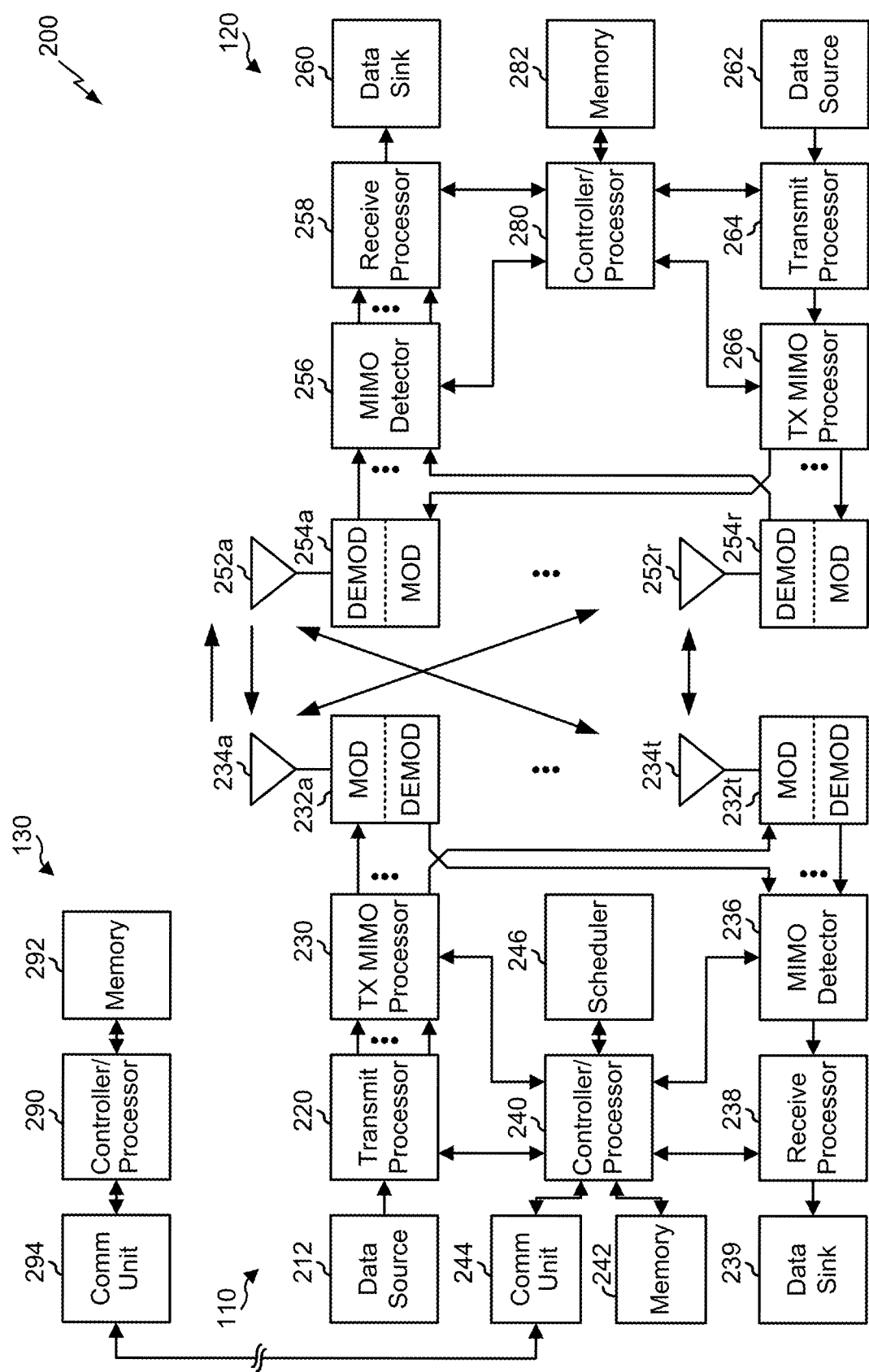
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with scheduling for a time-synchronized wireless network, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for synchronizing a clock of UE 120 to a frame structure of a time-synchronized wireless network, means for receiving configuration information relating to a quality of service profile and a first set of time intervals for the clock of UE 120, means for determining a second set of time intervals for the frame structure of the time-synchronized wireless network based at least in part on the configuration information, means for communicating on the time-synchronized wireless network during one or more time intervals of the second set of time intervals, and/or the like. In some aspects, such means may include one or more components of UE 120 described in connection with FIG. 2.

In some aspects, an access node, such as base station 110, may include means for synchronizing a clock of the access node to a frame structure of a time-synchronized wireless network, means for receiving configuration information relating to a quality of service profile and a first set of time intervals for the clock of the access node, means for mapping the first set of time intervals for the clock of the access node to a second set of time intervals of the frame structure of the time-synchronized wireless network based at least in part on synchronizing the clock of the access node to the frame structure of the time-synchronized wireless network, means for communicating on the time-synchronized wireless network during one or more of the second set of time intervals based at least in part on the quality of service profile and based at least in part on mapping the first set of time intervals to the second set of time intervals, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
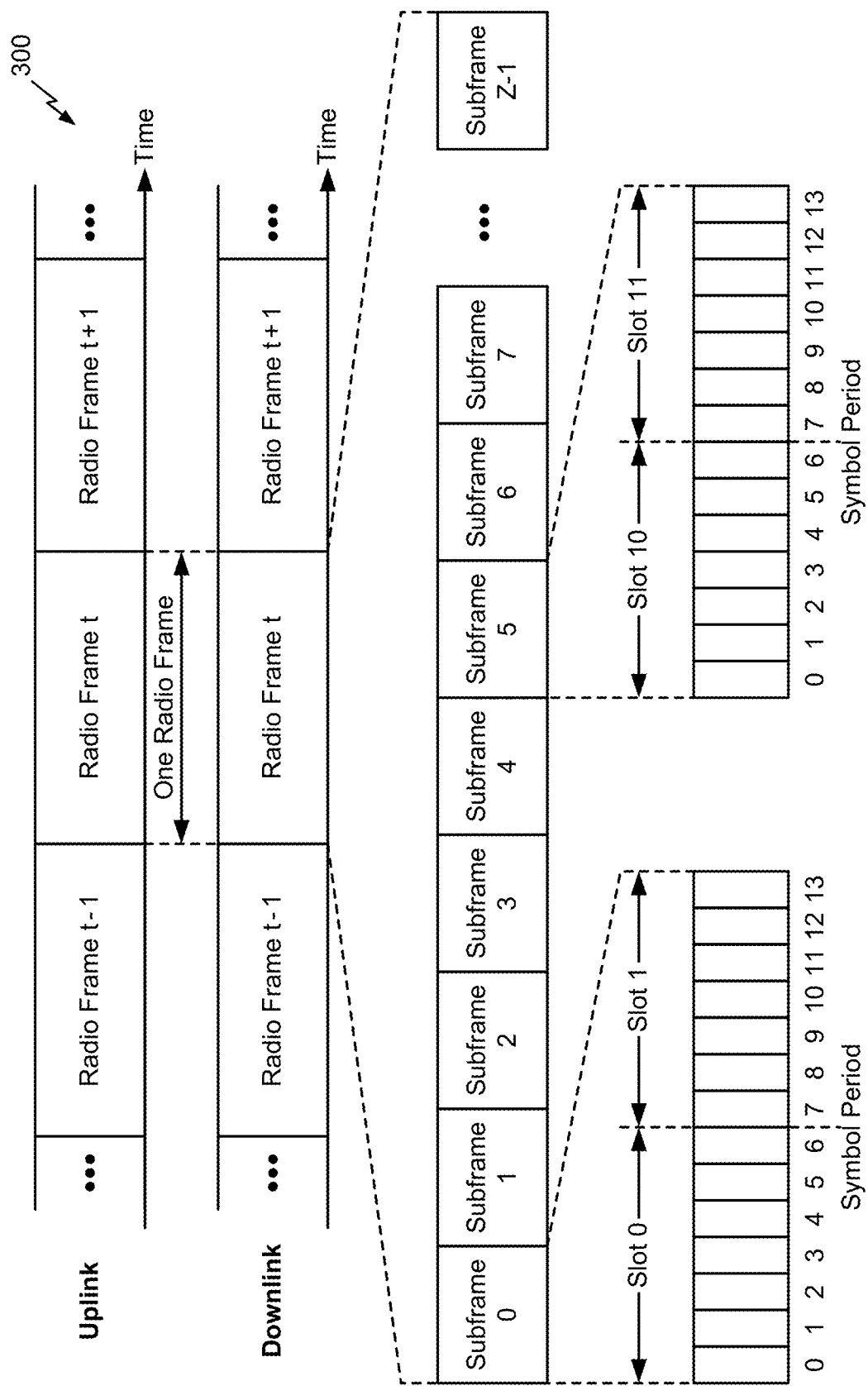
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
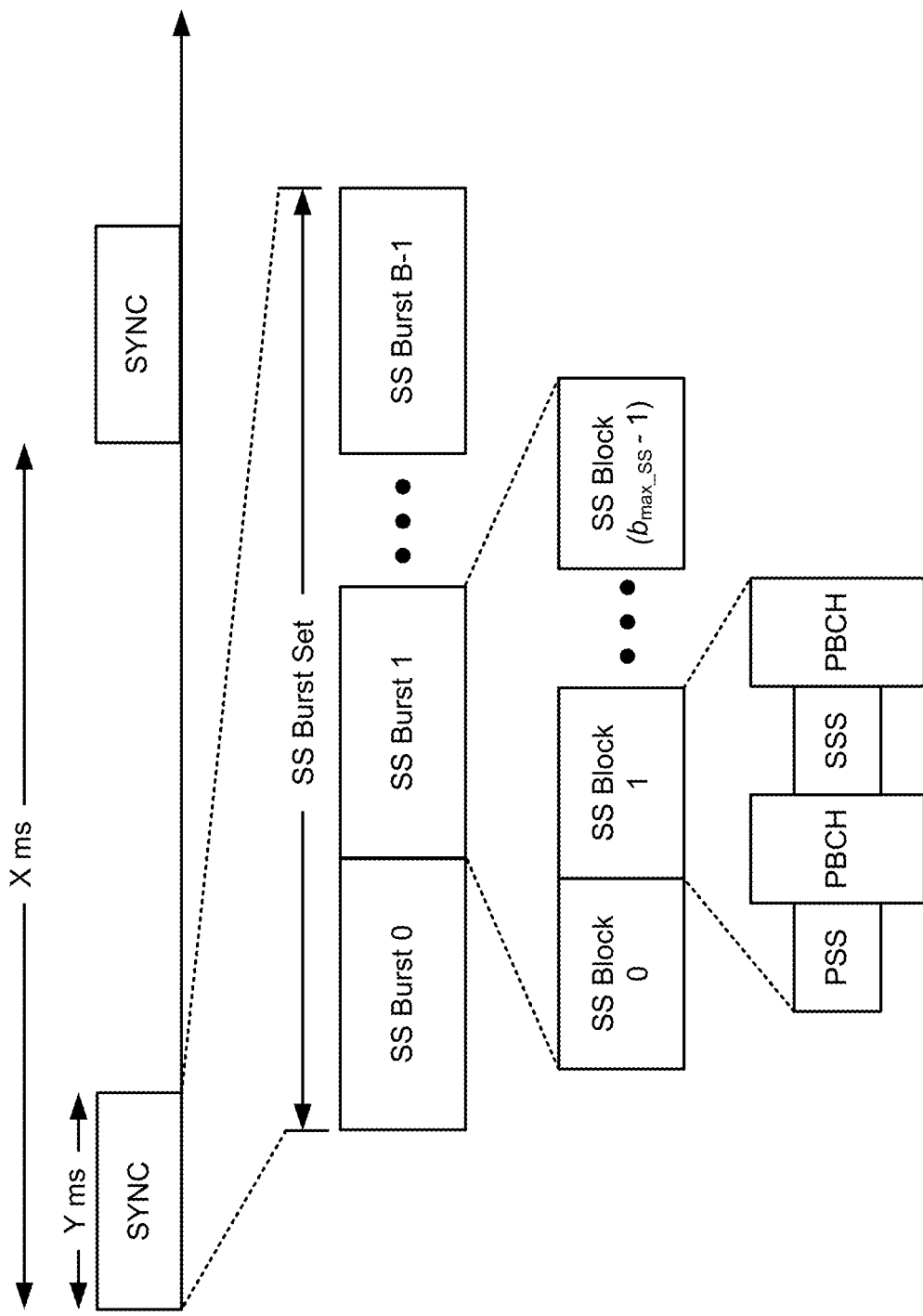
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
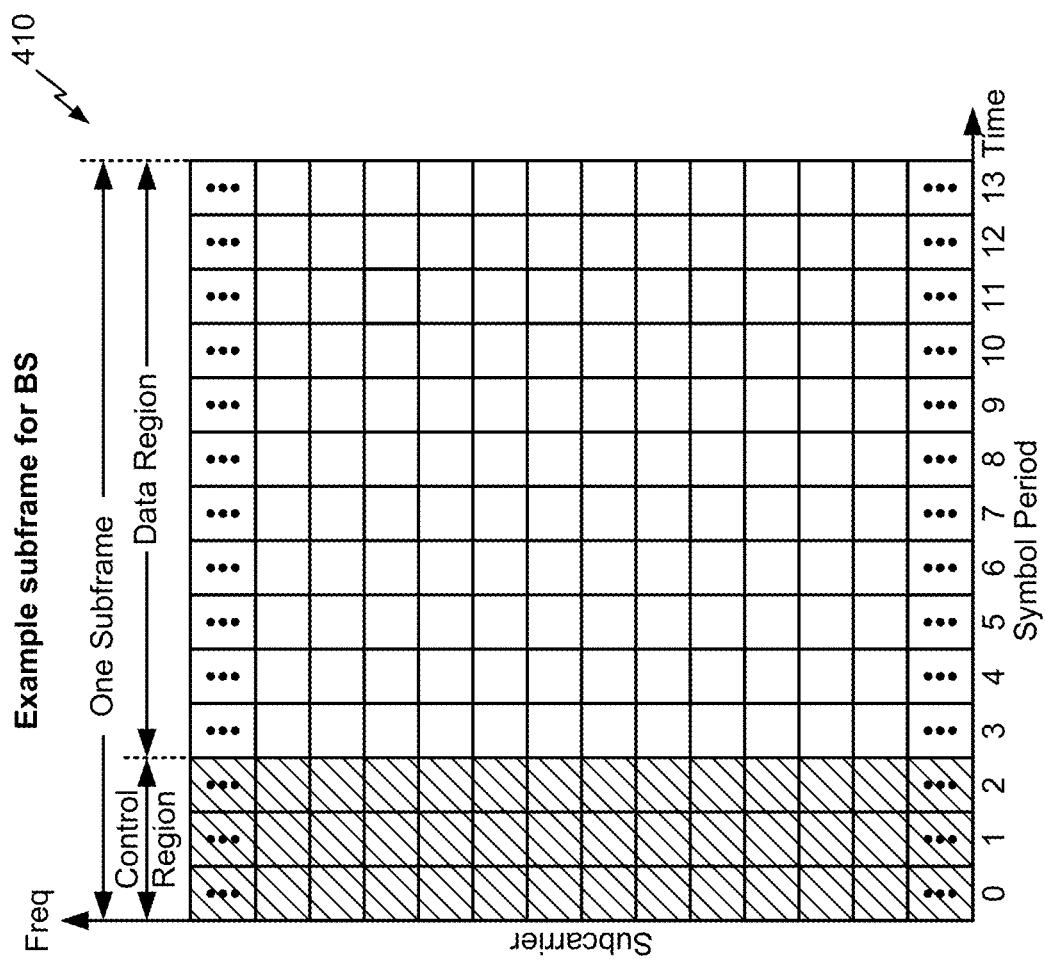
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
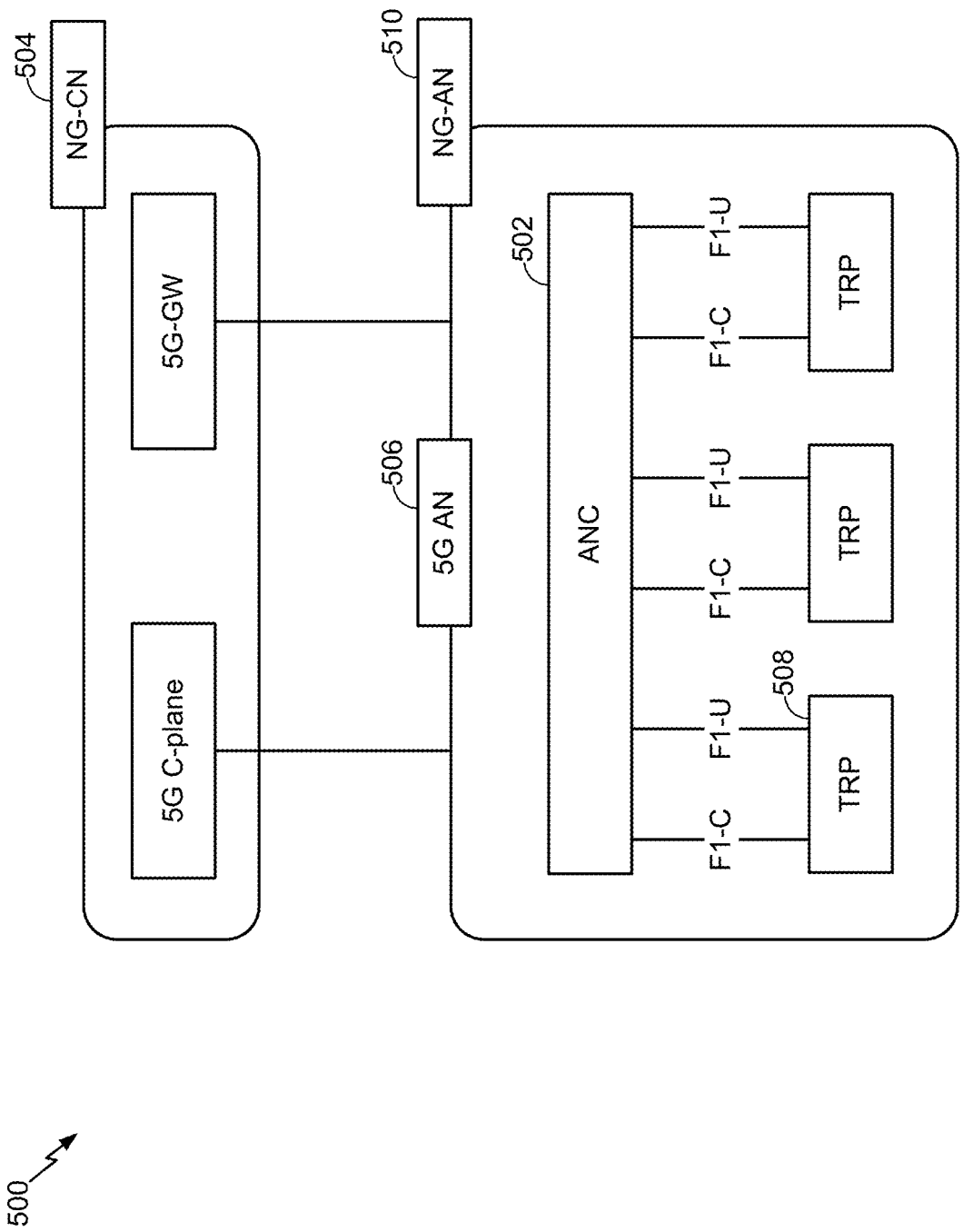
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
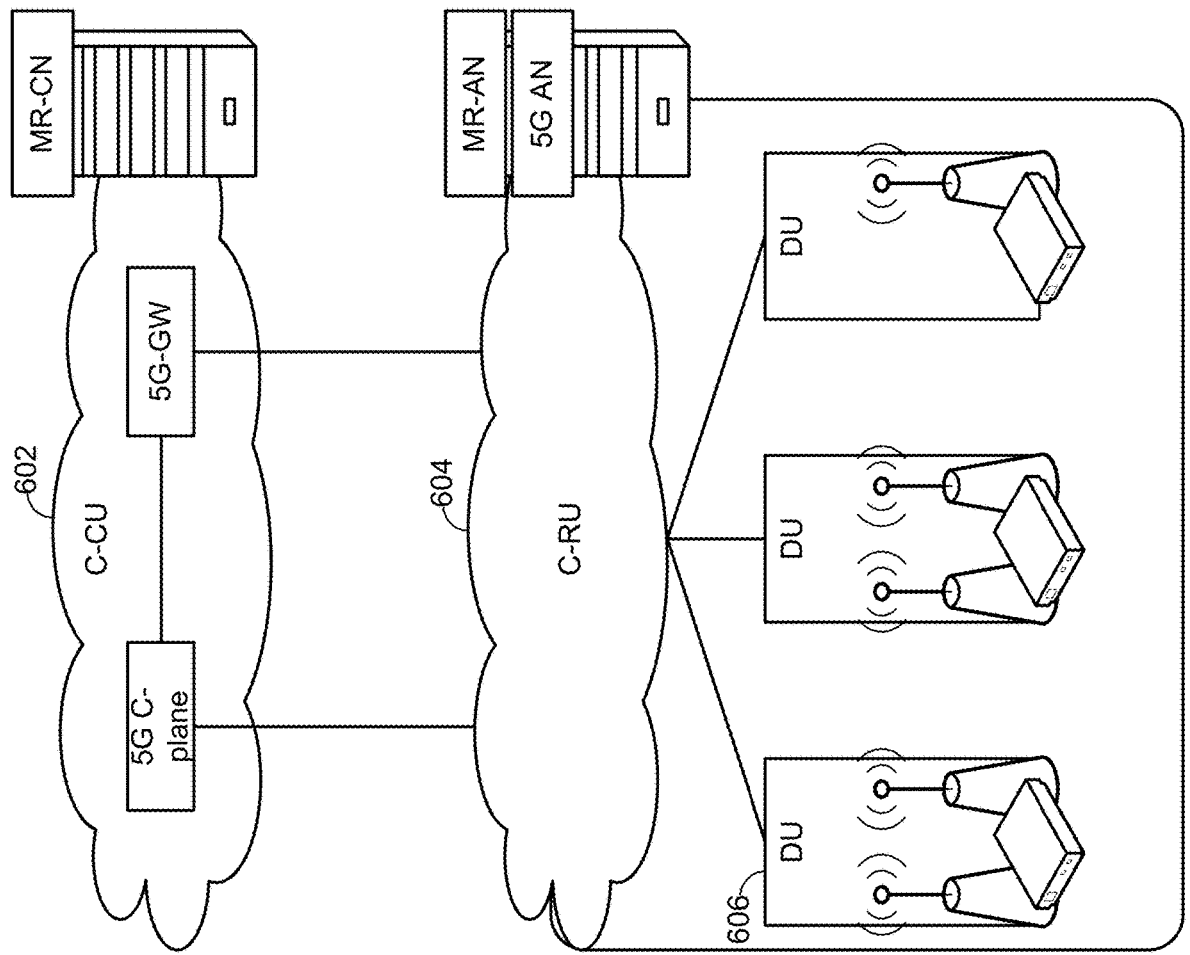
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A plurality of nodes of a network may communicate using a set of messages. For example, a first endpoint node may transmit a message to a second endpoint node via a set of switch nodes of the network. A wireline network may implement a time-synchronization technique or precision time protocol, such as Institute of Electrical and Electronics Engineers (IEEE) 802.1AS, "Timing and Synchronization for Time-Sensitive Applications in Bridged Local Area Networks." IEEE 802.1AS defines a distributed precision time protocol for a set of wireline links of a network. For example, in a factory setting, nodes associated with automated machinery may implement time-synchronization techniques to ensure synchronized operation of the automated machinery to within a threshold level of synchronization (e.g., clock synchronization to within 1 second, to within 0.1 seconds, to within 0.01 seconds, to within 0.001 seconds, to within 0.0001 seconds, and/or the like).

In some time-synchronization techniques, such as with precision time protocol, a node may be associated with a grand master (GM) function, which may include a reference time clock providing a reference time. The node may transmit precision time protocol messages to peer nodes that are connected via wireline connections to the node. The peer nodes may process the precision time protocol messages, and may propagate the precision time protocol messages to subsequent peer nodes in the network. A precision time protocol message may include a timestamp indicator identifying the reference time, such as a timestamp of the GM function, and may include an aggregated delay indicator identifying an aggregated delay relating to propagation of the precision time protocol message from a first node, to a second node, to a third node, and/or the like.

The aggregated delay may include a propagation delay for propagating the precision time protocol message across a wireline link, a residence delay for internal processing by a node, and/or the like. For example, for propagation of a precision time protocol message from a first node, to a second node, and to a third node, the aggregated delay may include a period of time for propagation on a first link between the first node and the second node, a period of time for processing by the second node, a period of time for propagation on a second link between the second node and the third node, and/or the like. Each node may update the aggregated delay before propagating the precision time protocol message to a next peer node in the network. A first node may determine the propagation delay associated with communicating with a second node using a round-trip-time (RTT) measurement. The RTT measurement may include a handshake message exchange to provide time-of-arrival information, time-of-departure information, and/or the like.

When a node receives a precision time protocol message from a peer node, the node may derive a present time of the GM function based at least in part on the reference time at which the precision time protocol message was first transmitted and the aggregated delay associated with propagation of the precision time protocol message. In this way, the node may maintain time-synchronization of a clock of the node with other clocks of other nodes.

In some cases, a time-synchronized wireline network may enable time-aware scheduling. For example, a set of periodic time intervals of a clock of the GM function may be reserved for a particular class of traffic. In this way, the time-synchronized wireline network may ensure that a transmitter node is reserved transmission resources to transmit time-sensitive information to a receiver node in a time-synchronized network.

However, some networks may include wireless links, such as cellular links, wireless local area network (WLAN) links, wireless wide area network (WWAN) links, and/or the like. In this case, reservation of transmission resources may be performed based at least in part on grant requests and quality of service parameters, which may prevent a reservation of transmission resources corresponding to a time of the clock of the GM function. Some aspects, described herein, may enable scheduling for time-synchronized wireless networks. For example, an access node and/or a user equipment may synchronize a clock to a frame structure of the time-synchronized wireless network, and may determine a set of time intervals for communication on the time-synchronized wireless network using configuration information identifying traffic classes for time-synchronized wired networks connected to the access node and the user equipment.

Figure 7A:
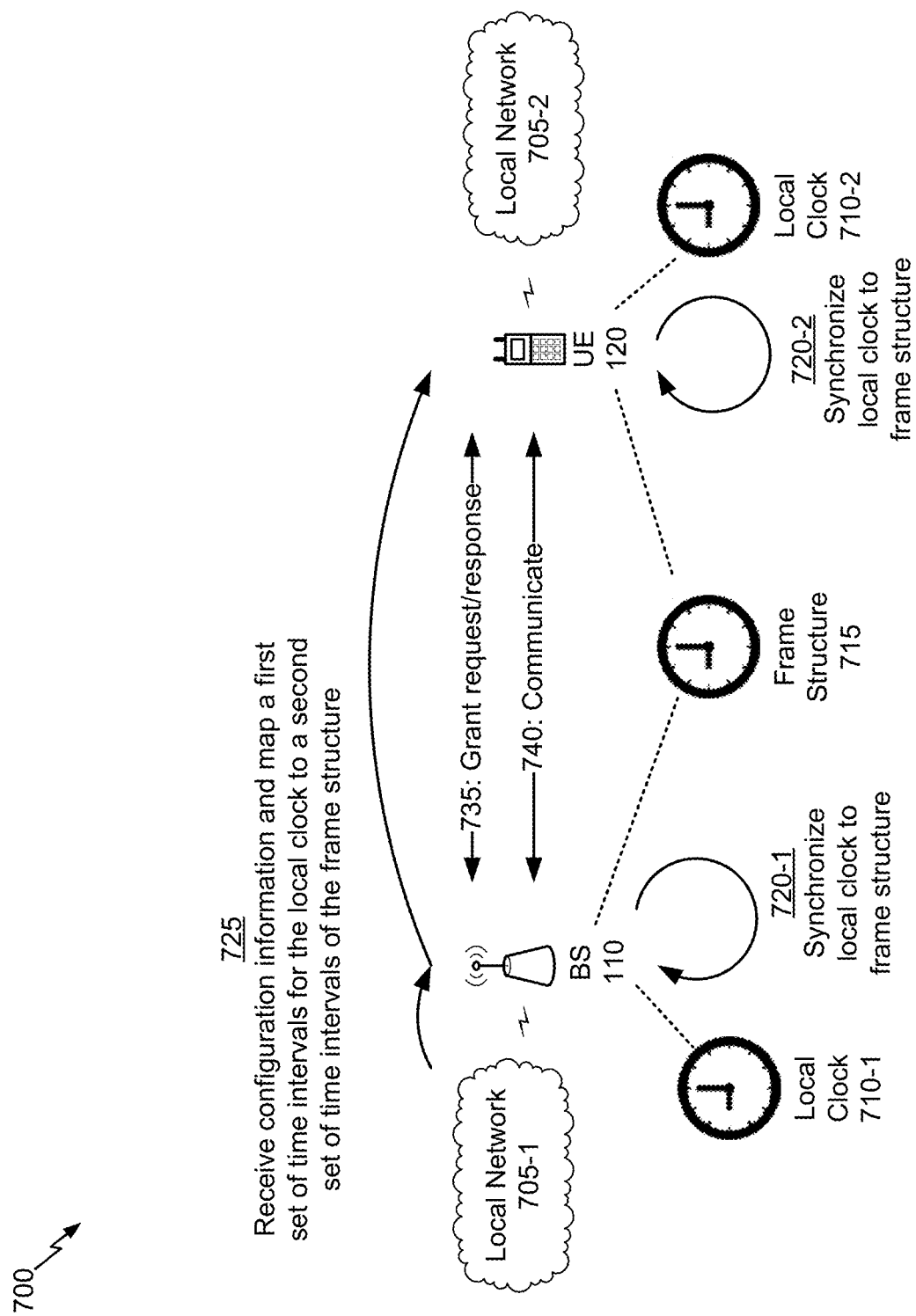
FIGS. 7A and 7B are diagrams illustrating an example of scheduling for a time-synchronized wireless network, in accordance with various aspects of the present disclosure.
Figure 7B:
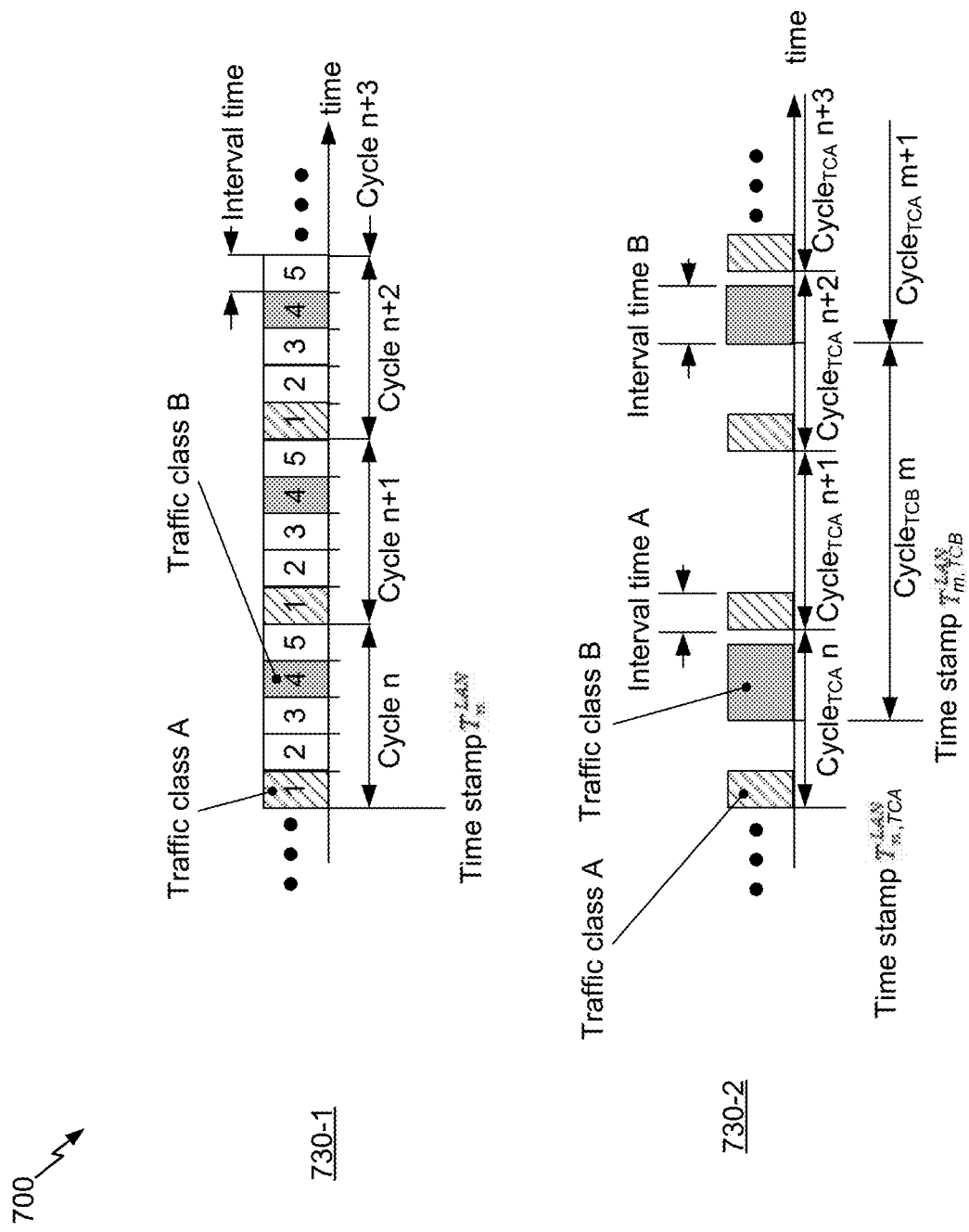

FIGS. 7A and 7B are diagrams illustrating an example 700 of scheduling for a time-synchronized wireless network, in accordance with various aspects of the present disclosure. As shown in FIG. 7A, example 700 includes a BS 110 (e.g., an access node) connected to a local network 705-1 and associated with a local clock 710-1, and includes a UE 120 connected to a local network 705-2 and associated with a local clock 710-2. BS 110 and UE 120 may communicate using a time-synchronized wireless network with a frame structure 715 that is common to BS 110 and UE 120.

In some aspects, local networks 705-1 and 705-2 may be local area networks (LANs) (e.g., Ethernet networks) which implement a time-aware protocol such as the Time Sensitive Networking (TSN) protocol. Time-sensitive networking (TSN) represents a set of IEEE 802.1 features that support hard-real-time traffic for certain use cases. In particular, time-aware scheduling defines a TSN feature which allows reserving absolute periodic time intervals for specific traffic classes on the transmitter side of an Ethernet link. In some aspects, local networks 705-1 and 705-2 may be sections of a common local area network. In some aspects, local networks 705-1 and 705-2 may be different local area networks. In some aspects, local networks 705-1 and 705-2 may include a single node, a plurality of nodes, and/or the like. In some aspects, local networks 705-1 and 705-2 may include wired links, wireless links, or a combination of wired links and wireless links.

As further shown in FIG. 7A, and by reference numbers 720-1 and 720-2, BS 110 and/or UE 120 may synchronize respective local clocks to frame structure 715 of the time-synchronized wireless network. These local clocks 710 may be used for LAN-based communication and, in some aspects, to support time-sensitive networking. For example, BS 110 may synchronize local clock 710-1 to frame structure 715. Similarly, UE 120 may synchronize local clock 710-2 to frame structure 715. In some aspects, local clock 710-1 may be synchronized with local clock 710-2. For example, BS 110 and UE 120 may synchronize local clocks 710 using a global navigation satellite system (GNSS) clock synchronization technique, a precision time protocol (PTP) over wireless interface synchronization technique, and/or the like to a common GM function. In this case, based at least in part on synchronizing local clocks 710, BS 110 and UE 120 may map time intervals of local clocks 710 to time intervals of frame structure 715. For example, BS 110 may map a first set of time intervals of local clock 710 to a second set of time intervals of frame structure 715 based at least in part on a timestamp associated with a GM function, a propagation delay associated with the GM function, and/or the like.

In some aspects, local network 705-1 may be time-synchronized with local network 705-2. For example, BS 110 and UE 120 may each receive, from local network 705-1 and local network 705-2, respectively, synchronization information identifying a timestamp of a GM function, a propagation delay indicator associated with propagating the timestamp of the GM function, and/or the like. In this case, BS 110 and/or UE 120 may use the synchronization information to synchronize local clocks 710 to frame structure 715. In this way, BS 110 and UE 120 enable communication between time-synchronized local networks 705 via a time-synchronized wireless network.

As further shown in FIG. 7A, and by reference number 725, BS 110 and/or UE 120 may receive configuration information and may map a first set of time intervals for a local clock 710 to a second set of time intervals of frame structure 715. For example, BS 110 may receive configuration information identifying an allocation of a set of time intervals of local clock 710-1 for one or more traffic classes corresponding to traffic for transmission via the time-synchronized wireless network, and may map the allocation of the set of time intervals of local clock 710-1 to another set of time intervals of frame structure 715. For instance, the one or more intervals may be associated with TSN traffic and, based on the configuration information, and based on having synchronized its clock the frame structure of the time-synchronized wireless network, BS 110 may map the TSN traffic to time intervals associated with frame structure 715.

In some aspects, BS 110 may receive the configuration information from a node associated with local network 705-1, such as a scheduling node, a centralized node, a centralized network controller, a software defined networking node, and/or the like. In some aspects, BS 110 may receive the configuration information from a network function, such as a mobility management entity (MME), an authentication management field (AMF), a session management function (SMF), a policy and charging rules function (PCRF), a policy control function (PCF), a network exposure function (NEF), an application function (AF), and/or the like.

Although some aspects, described herein, are described in terms of a particular type of network function (e.g., a 4G/LTE network function), other network functions may be possible, such as 5G/NR network functions and/or the like. In some aspects, UE 120 may receive the configuration information, and may map an allocation of network resources for a particular class of traffic to frame structure 715.

In some aspects, BS 110 may receive configuration information associated with identifying traffic classes for mapping to one or more time intervals of frame structure 715. For example, BS 110 may receive traffic class identifier information identifying a plurality of traffic classes, such as information identifying a source Ethernet address (e.g., of local network 705-1), a destination Ethernet address (e.g., of local network 705-2), a virtual local area network (VLAN) identifier, a VLAN priority code point (PCP) value, a source Internet protocol (IP) address, a destination IP address, a differentiated services code point (DSCP) value, a packet data network (PDN) connection identifier, an evolved packet system (EPS) bearer identifier, a quality of service (QoS) class identifier (QCI), a data radio bearer (DRB) identifier, a protocol data unit (PDU)-session identifier, a 5G QoS identifier (5QI), a QoS flow identifier (QFI), and/or the like. In some aspects, the traffic class identifier information may permit the BS 110 to map a particular traffic class to one or more time intervals of frame structure 715.

In some aspects, the configuration information may include synchronization information identifying intervals of, for example, local clock 710-1; offset values for a delay in propagating data between nodes of, for example, local network 705-1; and/or the like. In some aspects, BS 110 may receive a quality of service profile associated with allocating traffic class-specific resources (e.g., time intervals) for communication, and may map the traffic class-specific resources to intervals of frame structure 715. For example, BS 110 may receive information identifying a period of time for a cycle, which may be divided into a plurality of intervals for transmission of network traffic and a traffic class for at least one of the plurality of intervals. In this case, BS 110 may define the at least one of the plurality of intervals for frame structure 715 as allocated for a particular class of traffic, such as based at least in part on a hyper frame number (HFN), a system frame number (SFN), a subframe number, and/or the like of frame structure 715 corresponding to a particular time of local clock 710-1.

In some aspects, BS 110 may provide configuration information to UE 120. For example, BS 110 may provide information identifying intervals of frame structure 715 and traffic classes assigned to a subset of intervals of frame structure 715. In some aspects, BS 110 may provide the configuration information using a control channel, such as a physical downlink control channel (PDCCH). Additionally, or alternatively, UE 120 may receive the configuration information using a media access control (MAC) control channel, a radio resource control (RRC) message, a non-access stratum (NAS) message, an in-band message of a user-plane, a dedicated DRB message, an EPS bearer message, a PDN connection message, an uplink flow message with a dedicated flow identifier, a PDU session message, an Ethernet packet message (e.g., associated with a dedicated Ethernet type indicator, a VLAN identifier, a VLAN PCP value, and/or the like), and/or the like. In some aspects, UE 120 may receive configuration information from another network node or network function, and may determine the allocation of traffic classes to intervals of frame structure 715 (e.g., without receiving information from BS 110).

FIG. 7B shows an example of sets of intervals for communication of network traffic. As shown by reference number 730-1, BS 110 may determine a set of time intervals of a transmission cycle of frame structure 715, and may assign different traffic classes to different time intervals of the set of time intervals. In this case, BS 110 may define, for each traffic class, a separate interval associated with a common interval length. In some aspects, BS 110 may define a same time interval in each cycle for a particular traffic class. For example, BS 110 may determine time interval 1 in cycle n, cycle n+1, cycle n+2, etc. for traffic class A. Similarly, BS 110 may determine time interval 4 in cycle n, cycle n+1, cycle n+2, etc. for traffic class B. As shown by reference number 730-1, in another example, BS 110 may determine different length time intervals for different traffic classes, and may schedule traffic of a particular class for a particular time interval of a length corresponding to the particular class. In this case, BS 110 may define different cycles for different traffic classes, and may schedule a traffic class in an interval of each cycle associated with the traffic class. For example, for traffic class A, BS 110 schedules transmission for intervals in $cycle_{TC\ A}$ n, $cycle_{TC\ A}$ n+1, etc. Similarly, for traffic class B, BS 110 schedules transmission for intervals in $cycle_{TC\ B}$ m, $cycle_{TC\ B}$ m+1, etc., where $cycle_{TC\ A}$ is different from $cycle_{TC\ B}$.

In some aspects, BS 110 may schedule traffic based at least in part on a scheduling of traffic for local network 705-1. For example, local network 705-1 may be associated with time-aware schedule for a periodic cycle defined by a GM function synchronized to local clock 710-1 (e.g., scheduled by a scheduling node, by BS 110, and/or the like). In this case, BS 110 may determine a scheduling for traffic on the time-synchronized wireless network based at least in part on the time-aware scheduling for local network 705-1, cycle length information, offset information identifying an offset between local clock 710-1 and frame structure 715 (e.g., a timestamp offset, a propagation delay, and/or the like), and/or the like. In some aspects, BS 110 may receive mapping information identifying a mapping of a traffic class identifier to an interval identifier, and may schedule traffic for a traffic class corresponding to the traffic class identifier on an interval of the time-synchronized wireless network corresponding to the interval identifier.

In some aspects, BS 110 may alter frame structure 715 based at least in part on the configuration information associated with local clock 710-1. For example, BS 110 may cause one or more time intervals to be shifted, one or more system frame boundaries to be altered, one or more cycle or interval boundaries to be altered, and/or the like to align frame structure 715 to local clock 710-1 and enable time-aware scheduling on the time-synchronized wireless network.

As further shown in FIG. 7A, and by reference number 735, UE 120 may provide, and BS 110 may receive, a grant request, and BS 110 may provide, and UE 120 may receive, a grant response. For example, UE 120 may request a scheduling grant from BS 110, and may cause BS 110 to provide the scheduling grant to UE 120. In this way, UE 120 receives an indication of an allocation of resources for transmitting network traffic associated with a particular traffic class during an interval allocated for the particular traffic class. In some aspects, BS 110 may provide the scheduling grant based at least in part on a quality of service profile associated with local network 705-1. In some aspects, UE 120 may semi-statically schedule transmission of network traffic for time intervals corresponding to traffic classes associated with the network traffic, thereby reducing a utilization of network resources relative to dynamically scheduling transmission of network traffic. In this case, UE 120 may provide information, such as a grant request, an indication of the semi-static scheduling, and/or the like using a control channel, such as a physical uplink control channel (PUCCH). Additionally, or alternatively, UE 120 may provide the information to BS 110 via a MAC control channel, an RRC message, an NAS message, an in-band of a user-plane, an Ethernet packet, and/or the like.

As further shown in FIG. 7A, and by reference number 740, BS 110 and UE 120 may communicate using the time-synchronized wireless network. For example, based at least in part on a schedule of time intervals for frame structure 715, which corresponds to a schedule of time intervals for local clocks 710, BS 110 and UE 120 may communicate traffic corresponding to a particular traffic class during a particular interval corresponding to the particular traffic class.

As indicated above, FIGS. 7A and 7B are provided as an example. Other examples are possible and may differ from what was described with respect to FIGS. 7A and 7B.

Figure 8:
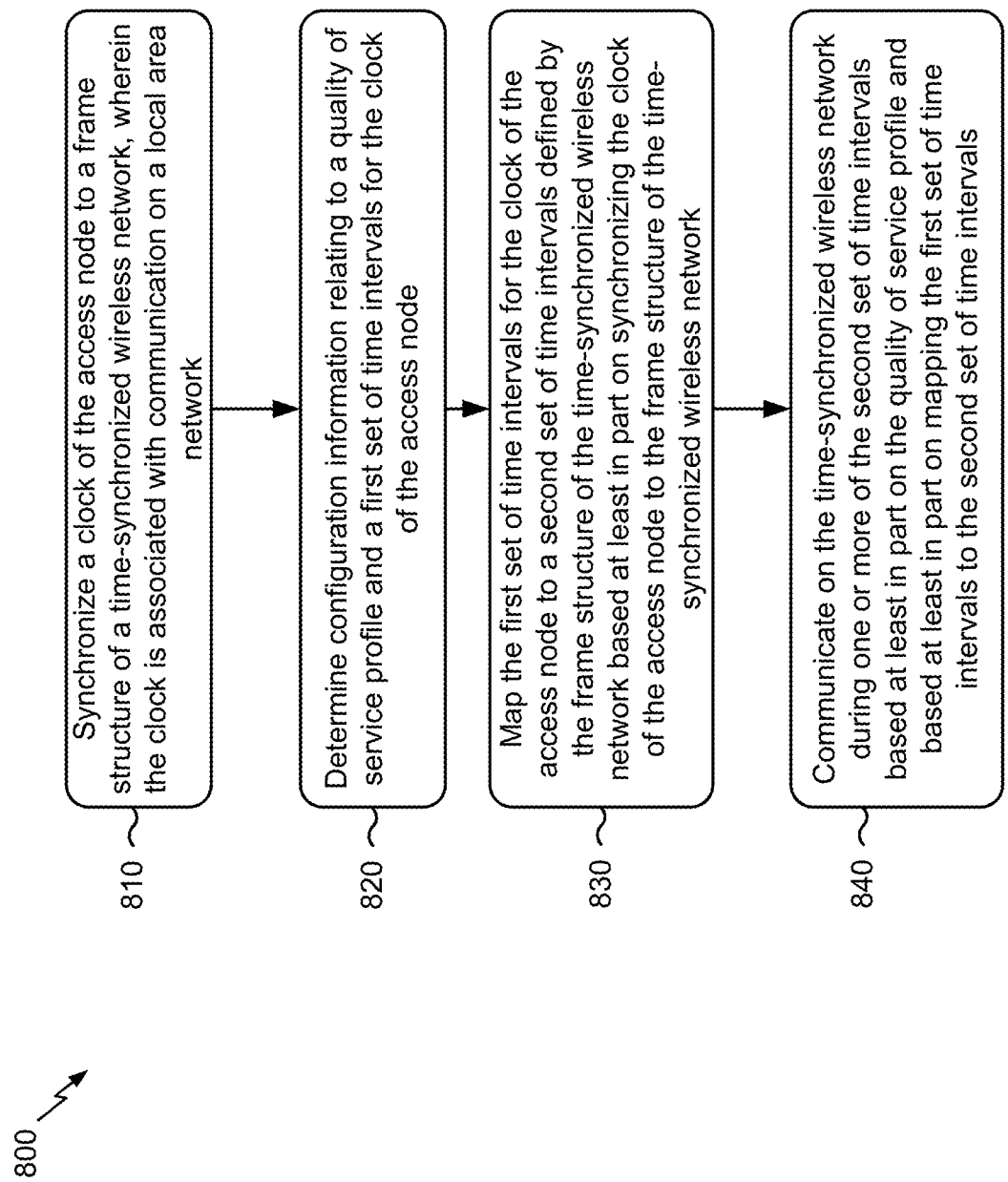
FIG. 8 is a diagram illustrating an example process performed, for example, by an access node, in accordance with various aspects of the present disclosure.

FIG. 8 is a diagram illustrating an example process 800 performed, for example, by an access node, in accordance with various aspects of the present disclosure. Example process 800 is an example where an access node (e.g., BS 110) performs scheduling for a time-synchronized wireless network.

As shown in FIG. 8, in some aspects, process 800 may include synchronizing a clock of the access node to a frame structure of a time-synchronized wireless network, wherein the clock is associated with communication on a local area network (block 810). For example, the access node (e.g., using transmit processor 220, controller/processor 240, receive processor 238, and/or the like) may synchronize the clock of the access node to the frame structure of the time-synchronized wireless network, as described in more detail above. In some aspects, the clock is associated with communication on a local area network.

As further shown in FIG. 8, in some aspects, process 800 may include determining configuration information relating to a quality of service profile and a first set of time intervals for the clock of the access node (block 820). For example, the access node (e.g., using antenna 234, demodulator 232, MIMO detector 236, receive processor 238, and/or the like) may determine the configuration information relating to the quality of service profile and the first set of time intervals for the clock of the access node, as described in more detail above.

As further shown in FIG. 8, in some aspects, process 800 may include mapping the first set of time intervals for the clock of the access node to a second set of time intervals defined by the frame structure of the time-synchronized wireless network based at least in part on synchronizing the clock of the access node to the frame structure of the time-synchronized wireless network (block 830). For example, the access node (e.g., using transmit processor 220, controller/processor 240, receive processor 238, and/or the like) may map the first set of time intervals for the clock of the access node to the second set of time intervals of the frame structure of the time-synchronized wireless network based at least in part on synchronizing the clock of the access node to the frame structure of the time-synchronized wireless network, as described in more detail above.

As further shown in FIG. 8, in some aspects, process 800 may include communicating on the time-synchronized wireless network during one or more of the second set of time intervals based at least in part on the quality of service profile and based at least in part on mapping the first set of time intervals to the second set of time intervals (block 840). For example, the access node (e.g., using antenna 234, modulator 232, TX MIMO processor 230, transmit processor 220, receive processor 238, MIMO detector 236, demodulator 232, and/or the like) may communicate on the time-synchronized wireless network during the one or more of the second set of time intervals based at least in part on the quality of service profile and based at least in part on mapping the first set of time intervals to the second set of time intervals, as described in more detail above.

Process 800 may include additional aspects, such as any single aspect and/or any combination of aspects described below and/or in connection with one or more other processes described elsewhere herein.

In some aspects, the configuration information includes information identifying at least one of a timestamp for the clock of the access node, an interval time, or a periodicity value. In some aspects, the configuration information includes an indicator of the one or more of the second set of time intervals. In some aspects, the configuration information includes a traffic class indicator for a traffic class, and the traffic class is scheduled for the one or more of the second set of time intervals based at least in part on the traffic class indicator.

In some aspects, the configuration information includes a traffic class indicator related to a traffic flow, an evolved packet system bearer, a tunnel, a quality of service flow identifier, a protocol data unit session, a packet data network connection, a traffic-flow-template entry, and/or the like. In some aspects, the access node is configured to provide information identifying a third set of time intervals corresponding to the frame structure based at least in part on mapping the first set of time intervals to the second set of time intervals and is configured to receive uplink traffic during the third set of time intervals. In some aspects, the access node is configured to provide the information identifying the third set of time intervals in connection with a traffic flow, an evolved packet system bearer, a tunnel, a quality of service flow identifier, a protocol data unit session, a packet data network connection, a traffic-flow-template entry, and/or the like.

In some aspects, the frame structure is defined by at least one of a system frame number, a hyper frame number, or a subframe number. In some aspects, the access node is configured to adjust the frame structure based at least in part on the configuration information. In some aspects, the quality of service profile includes a 5G quality of service identifier, a quality of service class identifier, and/or the like.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
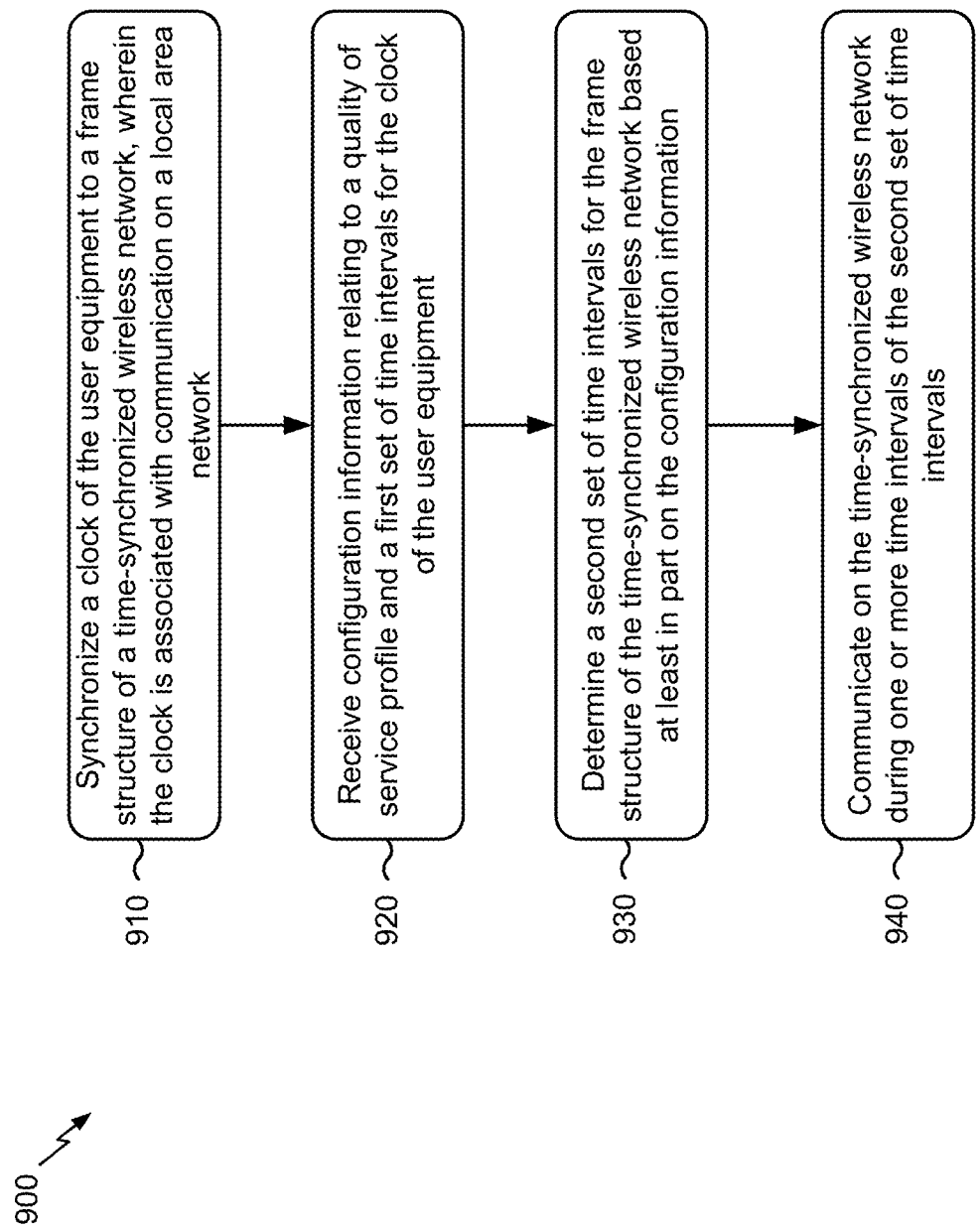
FIG. 9 is a diagram illustrating an example process performed, for example, by a user equipment, in accordance with various aspects of the present disclosure.

FIG. 9 is a diagram illustrating an example process 900 performed, for example, by a user equipment, in accordance with various aspects of the present disclosure. Example process 900 is an example where a user equipment (e.g., UE 120) performs scheduling for a time-synchronized wireless network.

As shown in FIG. 9, in some aspects, process 900 may include synchronizing a clock of the user equipment to a frame structure of a time-synchronized wireless network, wherein the clock is associated with communication on a local area network (block 910). For example, the user equipment (e.g., using receive processor 258, controller/processor 280, transmit processor 264, and/or the like) may synchronize the clock of the user equipment to the frame structure of the time-synchronized wireless network, as described in more detail above. In some aspects, wherein the clock is associated with communication on a local area network.

As further shown in FIG. 9, in some aspects, process 900 may include receiving configuration information relating to a quality of service profile and a first set of time intervals for the clock of the user equipment (block 920). For example, the user equipment (e.g., using antenna 252, demodulator 254, MIMO detector 256, receive processor 258, and/or the like) may receive the configuration information relating to the quality of service profile and the first set of time intervals for the clock of the user equipment, as described in more detail above.

As further shown in FIG. 9, in some aspects, process 900 may include determining a second set of time intervals for the frame structure of the time-synchronized wireless network based at least in part on the configuration information (block 930). For example, the user equipment (e.g., using receive processor 258, controller/processor 280, transmit processor 264, and/or the like) may determine the second set of time intervals for the frame structure of the time-synchronized wireless network based at least in part on the configuration information, as described in more detail above.

As further shown in FIG. 9, in some aspects, process 900 may include communicating on the time-synchronized wireless network during one or more time intervals of the second set of time intervals (block 940). For example, the user equipment (e.g., using controller/processor 280, transmit processor 264, TX MIMO processor 266, modulator 254, antenna 252, and/or the like) may communicate on the time-synchronized wireless network during the one or more time intervals of the second set of time intervals, as described in more detail above.

Process 900 may include additional aspects, such as any single aspect and/or any combination of aspects described below and/or in connection with one or more other processes described elsewhere herein.

In some aspects, the user equipment is configured to receive the grant based at least in part on requesting the grant. In some aspects, the user equipment is configured to communicate using the one or more time intervals of the second set of time intervals based at least in part on the grant. In some aspects, the configuration information includes information identifying at least one of a timestamp for the clock of the user equipment, an interval time, or a periodicity value. In some aspects, the configuration information includes an indicator of the one or more time intervals of the second set of time intervals.

In some aspects, the configuration information includes a traffic class indicator for a traffic class, and the traffic class is scheduled for the one or more time intervals of the second set of time intervals based at least in part on the traffic class indicator. In some aspects, the configuration information includes a traffic class indicator related to a traffic flow, an evolved packet system bearer, a tunnel, a quality of service flow identifier, a protocol data unit session, a packet data network connection, a traffic-flow-template entry, and/or the like. In some aspects, the user equipment is configured to receive a timestamp corresponding to the clock of the user equipment and provide the timestamp to a network node using the time-synchronized wireless network. In some aspects, the quality of service profile includes at least one of a 5G quality of service identifier or a quality of service class identifier.

In some aspects, the user equipment may request a grant for communicating on the time-synchronized wireless network, and may communicate on the time-synchronized wireless network using the grant. In some aspects, the user equipment may communicate on the time-synchronized wireless network using semi-persistent scheduling resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by an access node, comprising:
  synchronizing a clock of the access node to a frame structure of a time-synchronized wireless network, wherein the clock is associated with communication on a local area network that implements a Time Sensitive Networking (TSN) protocol;
  determining configuration information relating to a quality of service profile and a first set of time intervals for the clock of the access node,
    wherein the first set of time intervals is associated with TSN traffic;
  mapping the first set of time intervals for the clock of the access node to a second set of time intervals defined by the frame structure of the time-synchronized wireless network based at least in part on synchronizing the clock of the access node to the frame structure of the time-synchronized wireless network; and
  communicating on the time-synchronized wireless network during one or more of the second set of time intervals based at least in part on the quality of service profile and based at least in part on mapping the first set of time intervals to the second set of time intervals.

2. The method of claim 1, wherein determining the configuration information comprises one of:
  receiving the configuration information, or
  obtaining stored configuration information.

3. The method of claim 1, wherein the configuration information includes information identifying at least one of a timestamp for the clock of the access node, an interval time, a periodicity value, or any combination thereof.

4. The method of claim 1, wherein the configuration information includes an indicator of the one or more of the second set of time intervals.

5. The method of claim 1, wherein the configuration information includes a traffic class indicator for a traffic class, and
wherein the traffic class is scheduled for the one or more of the second set of time intervals based at least in part on the traffic class indicator.

6. The method of claim 1, wherein the configuration information includes a traffic class indicator related to at least one of:
a traffic flow,
an evolved packet system bearer,
a tunnel,
a quality of service flow identifier,
a protocol data unit session,
a packet data network connection, or
a traffic-flow-template entry.

7. The method of claim 1, wherein the access node is configured to provide information identifying a third set of time intervals corresponding to the frame structure based at least in part on mapping the first set of time intervals to the second set of time intervals and is configured to receive uplink traffic during the third set of time intervals.

8. The method of claim 7, wherein the access node is configured to provide the information identifying the third set of time intervals in connection with at least one of:
a traffic flow,
an evolved packet system bearer,
a tunnel,
a quality of service flow identifier,
a protocol data unit session,
a packet data network connection, or
a traffic-flow-template entry.

9. The method of claim 1, wherein the frame structure is defined by at least one of a system frame number, a hyper frame number, a subframe number, or any combination thereof.

10. The method of claim 1, wherein the access node is configured to adjust the frame structure based at least in part on the configuration information.

11. The method of claim 1, wherein the quality of service profile includes at least one of a 5G quality of service identifier or a quality of service class identifier.

12. The method of claim 1, wherein the configuration information identifies an allocation of the first set of time intervals for the clock of the access node for one or more traffic classes.

13. A method of wireless communication performed by a user equipment, comprising:
synchronizing a clock of the user equipment to a frame structure of a time-synchronized wireless network, wherein the clock is associated with communication on a local area network that implements a Time Sensitive Networking (TSN) protocol;
receiving configuration information relating to a quality of service profile and a first set of time intervals for the clock of the user equipment,
wherein the first set of time intervals is associated with TSN traffic;
determining a second set of time intervals for the frame structure of the time-synchronized wireless network based at least in part on the configuration information; and communicating on the time-synchronized wireless network during one or more time intervals of the second set of time intervals.

14. The method of claim 13, further comprising:
requesting a grant for communicating on the time-synchronized wireless network; and
wherein communicating on the time-synchronized wireless network comprises:
communicating on the time-synchronized wireless network using resources assigned by the grant and during the one or more time intervals.

15. The method of claim 13, wherein communicating on the time-synchronized wireless network comprises:
communicating on the time-synchronized wireless network using semi-persistent scheduling resources.

16. The method of claim 13, wherein the configuration information includes information identifying at least one of a timestamp for the clock of the user equipment, an interval time, a periodicity value, or any combination thereof.

17. The method of claim 13, wherein the configuration information includes an indicator of the one or more time intervals of the second set of time intervals.

18. The method of claim 13, wherein the configuration information includes a traffic class indicator for a traffic class, and
wherein the traffic class is scheduled for the one or more time intervals of the second set of time intervals based at least in part on the traffic class indicator.

19. The method of claim 13, wherein the configuration information includes a traffic class indicator related to at least one of:
a traffic flow,
an evolved packet system bearer,
a tunnel,
a quality of service flow identifier,
a protocol data unit session,
a packet data network connection, or
a traffic-flow-template entry.

20. The method of claim 13, wherein the user equipment is configured to receive a timestamp corresponding to the clock of the user equipment and provide the timestamp to a network node using the time-synchronized wireless network.

21. The method of claim 13, wherein the quality of service profile includes at least one of a 5G quality of service identifier or a quality of service class identifier.

22. An access node for wireless communication, comprising:
a memory; and
one or more processors operatively coupled to the memory, the memory and the one or more processors configured to:
synchronize a clock of the access node to a frame structure of a time-synchronized wireless network, wherein the clock is associated with communication on a local area network that implements a Time Sensitive Networking (TSN) protocol;
determine configuration information relating to a quality of service profile and a first set of time intervals for the clock of the access node,
wherein the first set of time intervals is associated with TSN traffic;
map the first set of time intervals for the clock of the access node to a second set of time intervals defined by the frame structure of the time-synchronized wireless network based at least in part on synchronizing the clock of the access node to the frame structure of the time-synchronized wireless network; and communicate on the time-synchronized wireless network during one or more of the second set of time intervals based at least in part on the quality of service profile and based at least in part on mapping the first set of time intervals to the second set of time intervals.

23. The access node of claim 22, wherein the one or more processors, when determining the configuration information, are to:

receive the configuration information, or obtain stored configuration information.

24. The access node of claim 22, wherein the configuration information includes information identifying at least one of a timestamp for the clock of the access node, an interval time, a periodicity value, or any combination thereof.

25. The access node of claim 22, wherein the configuration information includes an indicator of the one or more of the second set of time intervals.

26. The access node of claim 22, wherein the configuration information includes a traffic class indicator for a traffic class, and wherein the traffic class is scheduled for the one or more of the second set of time intervals based at least in part on the traffic class indicator.

27. A user equipment for wireless communication, comprising:

a memory; and one or more processors operatively coupled to the memory, the memory and the one or more processors configured to:

synchronize a clock of the user equipment to a frame structure of a time-synchronized wireless network, wherein the clock is associated with communication on a local area network that implements a Time Sensitive Networking (TSN) protocol;

receive configuration information relating to a quality of service profile and a first set of time intervals for the clock of the user equipment, wherein the first set of time intervals is associated with TSN traffic;

determine a second set of time intervals for the frame structure of the time-synchronized wireless network based at least in part on the configuration information; and communicate on the time-synchronized wireless network during one or more time intervals of the second set of time intervals.

28. The user equipment of claim 27, wherein the one or more processors are further configured to:

request a grant for communicating on the time-synchronized wireless network; and wherein the one or more processors, when communicating on the time-synchronized wireless network, are configured to:

communicate on the time-synchronized wireless network using resources assigned by the grant and during the one or more time intervals.

29. The user equipment of claim 27, wherein the one or more processors, when communicating on the time-synchronized wireless network, are to:

communicate on the time-synchronized wireless network using semi-persistent scheduling resources.

30. The user equipment of claim 27, wherein the configuration information includes information identifying at least one of a timestamp for the clock of the user equipment, an interval time, a periodicity value, or any combination thereof.

* * * * *